US007933209B2

(12) United States Patent
Abidi et al.

(10) Patent No.: US 7,933,209 B2
(45) Date of Patent: Apr. 26, 2011

(54) METHOD FOR ISOLATING LAYER 1 PROBLEMS FOR DIGITAL SIGNAL CIRCUITS EMBEDDED IN SONET

(75) Inventors: Mohammad Abidi, Manalapan, NJ (US); Donald R. Bozarth, Sacramento, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 371 days.

(21) Appl. No.: 12/152,563

(22) Filed: May 15, 2008

(65) Prior Publication Data
US 2009/0285575 A1    Nov. 19, 2009

(51) Int. Cl.
    *H04L 12/26* (2006.01)
(52) U.S. Cl. ............... 370/241; 370/249; 398/9; 398/17
(58) Field of Classification Search .................. 370/241, 370/249; 398/9, 12, 17
    See application file for complete search history.

(56) References Cited

U.S. PATENT DOCUMENTS

| 2003/0043753 A1* | 3/2003 | Nelson et al. ................. 370/249 |
| 2005/0220031 A1* | 10/2005 | Barton et al. ................. 370/242 |
| 2005/0249124 A1* | 11/2005 | Elie-Dit-Cosaque et al. 370/242 |
| 2006/0216041 A1* | 9/2006 | Hotta et al. ................... 398/208 |

* cited by examiner

*Primary Examiner* — Pankaj Kumar
*Assistant Examiner* — Gautam Sharma

(57) ABSTRACT

A method is disclosed that integrates performance monitoring data and alarms reported by Layer 3 network elements with alarms and performance monitoring data reported by Layer 1 SONET/SDH network elements to isolate Layer 1 problems on DSX circuits embedded in SONET due to hard failures or errors.

19 Claims, 7 Drawing Sheets

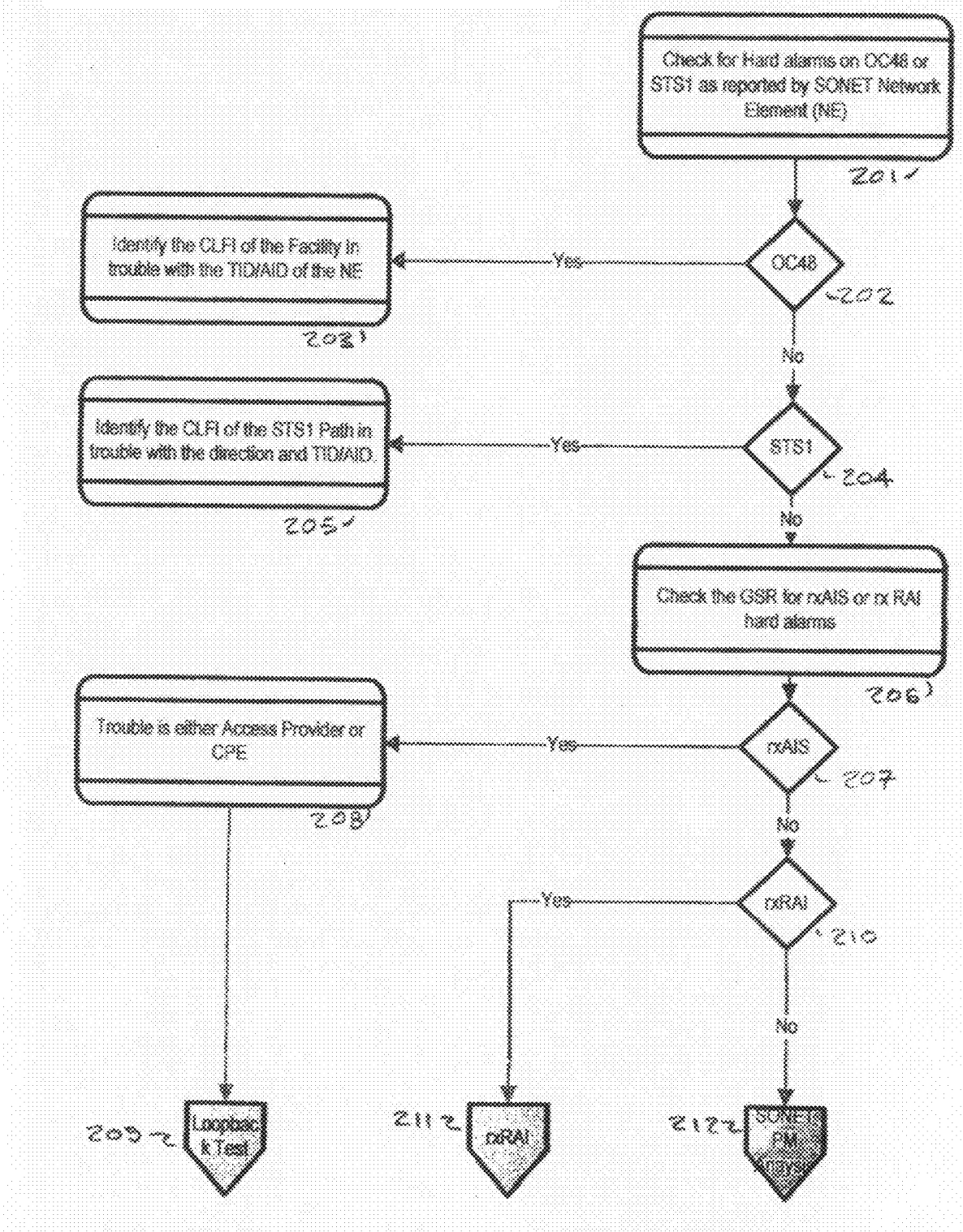

METHOD FOR ISOLATING LAYER 1 PROBLEMS FOR DIGITAL SIGNAL CIRCUITS EMBEDDED IN SONET

BACKGROUND OF THE INVENTION

The invention relates generally to high-capacity Synchronous Optical NETworking (SONET) telecommunications network interconnections and trouble isolation of customer digital signal circuits transported by the network. More specifically, the invention relates to detecting and isolating digital signal circuit problems at a DS3 level embedded in SONET protocol.

Traditional wireline telephone companies are divided into two large categories, long distance (IntereXchange Carrier, or IXC) and local/access (Local Exchange Carrier/Access Provider, or LEC/AP). An IXC carries both voice and data traffic for customers who have access to an IXC network via an LEC/AP. An IXC provides a network made up of a large number of high-capacity links/links that connect to different locations, where LECs/APs have Point of Interfaces (POI) that provide connections to customers for their Customer Premise Equipment (CPE). These links are of varying capacities (T3, OC-3, OC-48, OC-192, etc.) and the traffic in these links use Plesiochronous Digital Hierarchy (PDH) or SONET protocols.

There are major savings for an IXC to buy bulk optical access from an LEC/AP. In most new arrangements, the POI between the IXC and AP is optical and is referred to as an optical POI (OPOI). These OPOIs may carry optical or electrical customer circuits.

To build a facility from a source point A (POI) to a destination point Z (POI) requires access into an IXC network and the ability to route the traffic within this collection of links. The POIs can be either T3 or OC-N. Once an IXC receives traffic into its network at the source point A (POI), the IXC has to route the traffic over a number of different links (the Layer 1 transport network) to have it arrive at the destination point Z (POI). Each link segment that the IXC uses has two ends. The overall path that the traffic negotiates from source A to destination Z is a collection of link segments. Each end of the link segment has a sensor that can detect if traffic is flowing. An inventory of how the traffic flows from source A to destination Z lists all the link segments involved. If one of the links fails and the traffic stops flowing past its sensor, an alarm is sent to a network maintenance (surveillance) system. The network maintenance system identifies the problem link and can sectionalize the problem of the source A to destination Z traffic flow to the failed link segment.

While OPOIs provide reduction in access costs to IXCs, OPOIs do not have the ability to provide Service Assurance (SA) to that IXC's customer care for lower level digital signals, for example, Digital Signal (DSX) circuits which typically terminate on router Channelized Optical Carrier (CHOC) cards.

For DS3 circuits carried in these layouts, SONET/synchronous digital hierarchy (SDH) network elements (NEs) do not provide visibility to the IXCs for DS3 alarms or Performance Monitoring (PM) parameter data. Typically, there are no DS3 alarms available for a pure SONET network with an OPOI.

What is desired is a method that monitors/analyzes SONET and DSX alarms and Performance Monitoring (PM) data, and detects and locates faults on DSX circuits.

SUMMARY OF THE INVENTION

The inventors have discovered that it would be desirable to have a hierarchal method that provides SA of DSX circuits embedded in SONET/SDH transports. These types of transport circuits begin at a router in a customer's premises typically connecting to an IXC network via an OPOI access and terminate at a CHOC48/CHOC12 card in an IXC network router.

For DSX circuits transported on these layouts, SONET/SDH NEs do not provide IXC surveillance system visibility to DSX alarms or PM parameter data. The method integrates Layer 1 alarms and PM parameter data reported by Layer 3 NEs (IP routers) with alarms reported by Layer 1 SONET NEs to isolate Layer 1 DSX circuit problems due to equipment and/or facility hard failures or errors.

The method is a tool for IXCs that offers Virtual Private Network (VPN) and Managed Internet Service/Private Network Transport (MIS/PNT) IP services to customers on DS3 circuits with OPOI access and CHOC48/CHOC12 IXC router termination. In the absence of the method, VPN or MIS/PNT services cannot be offered to customers with circuits having layouts with OPOI access and CHOC48/CHOC12 IXC router terminations. The method provides Customer Care-Service Assurance (CC-SA) teams with a tool to diagnose possible problems on DSX circuits associated with VPN and MIS/PNT Service. The method uses alarm and PM parameter data as well as monitoring and loopback test capabilities to isolate problems between IXCs, APs and CPE. Availability of router reported DSX alarms allow the OS to keep an up-to-date T3 facility status of these circuits.

The method is extendable for other Layer 3 switches as well as termination at other OC-N rates at the Layer 3 switch end with the OPOI access. Additionally, the method may be extended to Layer 2 switches with CHOCn terminations and CPE-to-CPE Layer 1 transport layouts with OPOI access. The method can also be used for DSX circuits without OPOI access.

The invention provides a method for detecting and isolating problems in digital signal (DS) circuits embedded in optical carrier (OC) network paths. The method is triggered by a trouble ticket for a customer circuit. The trouble ticket can be either customer reported or created by an automatic detection of a circuit failure. The method includes analyzing OC-N or STS-N alarms from the network obtained by surveillance of the network, retrieval and analyzing of OC-N and STS-N PM data from NEs, retrieval and analyzing of the alarms and PM data from the router in the IXC network and performing real-time monitoring of the DS3 circuit for DS3 alarms and PM data. The method analyzes these alarms and PM data to isolate problems on the DS3 circuit. Problem isolation based on analysis indicates whether the problem is manifest at the IXC router, customer router, IXC network or AP network.

One aspect of the invention provides a method for detecting and isolating problems in Digital Signal (DS) circuits transported in synchronous optical networking paths. Methods according to this aspect of the invention include acquiring alarm data from Network Elements (NEs) in a defined synchronous optical networking path between an IntereXchange Carrier (IXC) router and a Customer Premises Equipment (CPE) router including an Access Provider (AP), acquiring Performance Monitoring (PM) parameter data from the NEs in the defined synchronous optical networking path, based on the alarm data and PM parameter data at Optical Carrier-N (OC-N), Synchronous Transport Signal (STS)-level N (STS-N) and DS level X (DSX) levels, isolating the IXC NEs, the AP NEs, and/or CPE NEs, analyzing the OC-N, STS-N and DSX alarm data to isolate a problem(s) on a DSX circuit, analyzing the OC-N and STS-N PM parameter data to isolate a problem(s) on the DSX circuit, analyzing DSX PM parameter data to isolate a problem(s) on the DSX circuit, and determining the root cause of a problem(s).

Another aspect of the invention provides a method that provides Service Assurance (SA) of digital signal (DS) circuits transported in synchronous optical networking paths. Methods according to this aspect of the invention include identifying alarms at OC-N, STS-N or DSX levels from Network Elements (NEs) in a defined synchronous optical networking path between an IntereXchange Carrier (IXC) router and a Customer Premises Equipment (CPE) router, isolating a problem(s) between the IXC, Access Provider (AP) network and CPE, and isolating a problem(s) between the CPE router and a Local Exchange Provider/Application Provider (LEC/AP).

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2A is an exemplary method for identifying alarms at OC-N, STS-N or DSX levels.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention.

Synchronous networking allows entire inter-country networks to operate synchronously, greatly reducing the amount of buffering required between elements in a network. Both SONET and SDH can be used to encapsulate earlier digital transmission standards or to support either ATM or Packet over SONET/SDH (POS) networking. SONET and SDH are generic transport containers for moving voice and data.

One advantage is the provision of overhead and payload bytes. The overhead bytes permit management of the payload bytes on an individual basis and facilitate centralized fault sectionalization. Another advantage is a synchronous multiplexing format for carrying lower level digital signals (such as DS1, DS3) and a synchronous structure that greatly simplifies the interface to digital switches, digital cross-connect switches, and add-drop multiplexers, yielding a flexible architecture capable of accommodating future applications, with a variety of transmission rates.

SONET/SDH defines optical carrier (OC) levels and electrically equivalent synchronous transport signals (STSs) for the fiber-optic-based transmission hierarchy. SONET/SDH can carry many signals of different capacities. This is accomplished by means of a byte-interleaved multiplexing scheme which simplifies multiplexing and offers end-to-end network management.

Figure 1:
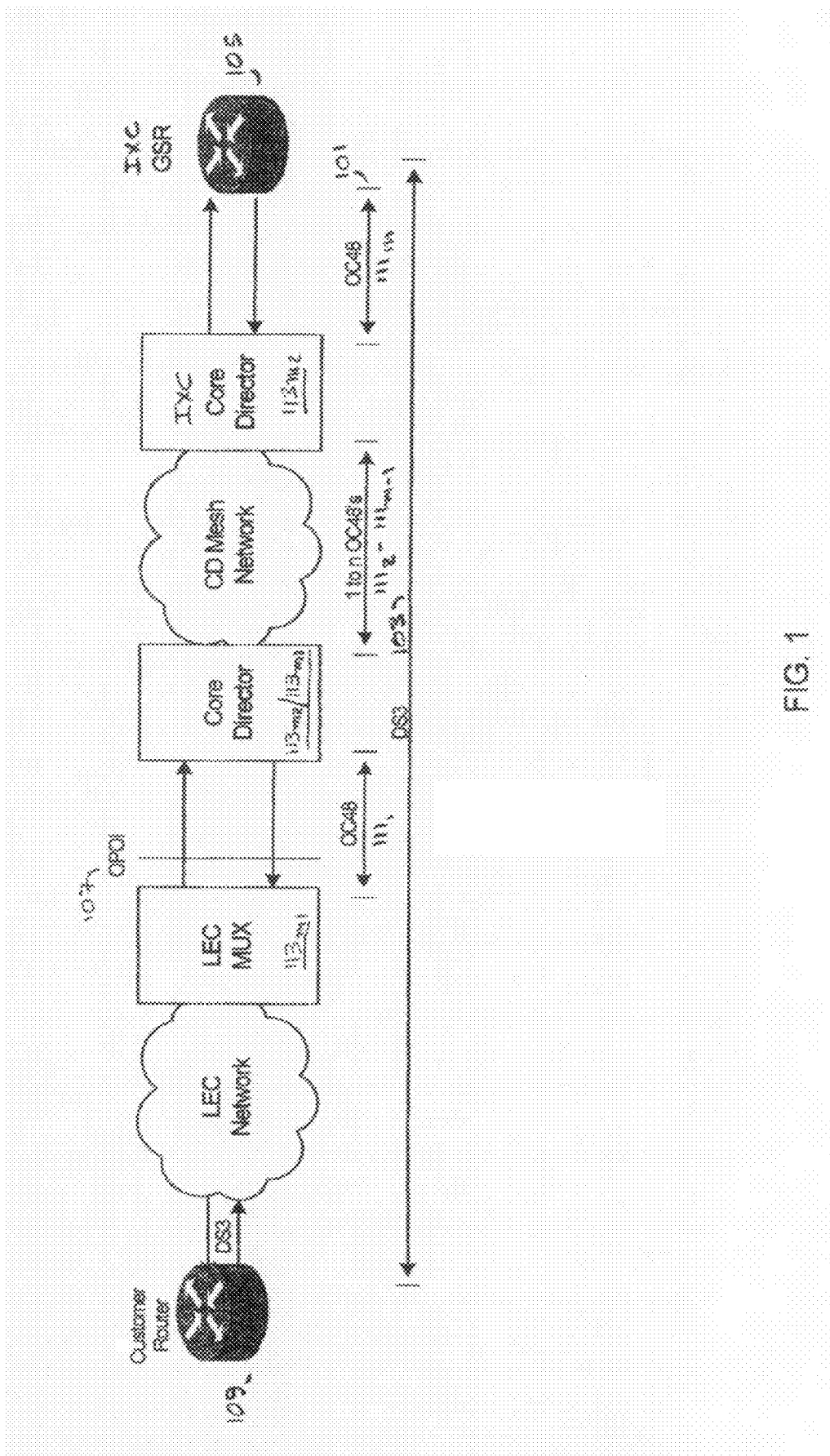
FIG. 1 is an exemplary OC-N path with a CPE router access end and an IXC router end carrying DSX circuits.

FIG. 1 shows an exemplary SONET OC-48 path 101 and DS3 circuit 103. Other OC-N and DSX levels may be employed. The path 103 terminates at an IXC Gigabit Switched Router (GSR) 105 with CHOC access and at an OPOI access end 107. An LEC optical multiplexer/demultiplexer $113_{m1}$ converts the optical signals into electrical digital signals (DS3). The LEC may be a local telephone company or any AP. The DS3 circuit couples to an OPOI GSR end 109.

The SONET physical layer is divided into four sublayers. The lowest sublayer is the photonic sublayer. The three remaining sublayers correspond to the sections, lines and paths. An optical fiber going directly from any device to any other device is referred to as a section. A run between two multiplexers is referred to as a line and the connection between a source node and a destination node with one or more multiplexers and repeaters is referred to as a path. The section sublayer handles a single point-to-point fiber run, generating a standard frame at one end and processing it at the other. Sections can start and end at repeaters, which amplify and regenerate the bits, but do not change or process them. The line sublayer is concerned with multiplexing multiple tributaries onto a single line and demultiplexing them at the other end. To the line sublayer, the repeaters are transparent. When a multiplexer outputs bits on a fiber, it expects them to arrive at the next multiplexer unchanged, no matter how many repeaters are used in between. The protocol in the line sublayer is between two multiplexers and deals with issues such as how many inputs are being multiplexed together and how. The path sublayer and protocol deal with end-to-end issues.

The SONET path 101 may include several lines $111_1$, $111_2$, ... $111_m$ (collectively 111) that terminate with Muxs (multiplexer/demultiplexer) $113_{m1}$, $113_{m2}$ (collectively 113). SONET topologies are typically configured as self-healing, dual-ring networks using dual fiber optic cables.

The invention may be applied to hubbed-rings, multi-hubbed rings, any-to-any rings, meshed rings, and variations of linear configurations, and other types of optical carriers. The basic SONET/SDH NE is any device which is part of a SONET/SDH transmission path and serves one or more of the section, line and path-terminating functions such as Add/Drop Multiplexers (ADMs), Broadband Digital Cross-connects (B-DCS), Wideband Digital Cross-connects (W-DCS), flexible multiplexers, Digital Loop Carriers (DLC), REGenerators (REGs), and others.

A single-stage Mux 113 can multiplex various inputs into an OC-N signal. At an ADM site, only those signals that need to be accessed are dropped or inserted. The remaining traffic continues through the NE without requiring special pass-through units or other signal processing.

A W-DCS (not shown) accepts various optical carrier rates, accesses STS-N, and switches at this level. One difference between a cross-connect and an ADM is that a cross-connect may be used to interconnect a much larger number of STS-1s. The B-DCS (not shown) can be used for grooming (consolidating or segregating) of STS-1s or for broadband traffic management. One advantage of a W-DCS is that less demultiplexing and multiplexing is required because only the required tributaries are accessed and switched. The W-DCS is a digital cross-connect that terminates SONET/SDH and DS-3 signals and has the basic functionality of Virtual Tributaries (VTs) and DS-1 level cross-connections. It is the SONET/SDH equivalent to the DS3/DS1 digital cross-connect and accepts optical OC-N signals as well as STS-1s, DS1s and DS3s. In a W-DCS, the switching is performed at the VT level.

Because SONET/SDH is synchronous, the low-speed tributaries are visible and accessible within the STS-1 signal. Therefore, the required tributaries can be accessed and switched without demultiplexing, which is not possible with existing digital cross-connects. In addition, the W-DCS cross-connects the constituent DS1s between DS3 terminations, and between DS3 and DS1 terminations. The features of the W-DCS make it useful in several applications. Because it can automatically cross-connect VTs and DS1s, the W-DCS can be used as a network-management system.

A B-DCS (not shown) interfaces various SONET/SDH signals and DS3 signals. It accesses the STS-1 signals and switches at this level. It is the synchronous equivalent of the DS3 digital cross-connect, except that the broadband digital cross-connect accepts optical signals and allows overhead to be maintained for integrated Operations, Administration, Maintenance and Provisioning (OAM&P) whereas asynchronous systems prevent overhead from being passed from optical signal to signal. The B-DCS can make two-way cross-connections at the DS3, STS-1 and STS-N levels.

A Digital Loop Carrier (DLC) (not shown) may be considered a concentrator of low-speed services before they are brought into the local Central Office (CO) for distribution. If this concentration were not performed, the number of subscribers (or lines) that a CO could serve would be limited by the number of lines served by the CO. The DLC itself is actually a system of multiplexers and switches designed to perform concentration from the remote terminals to the community dial office and, from there, to the CO. Whereas a SONET/SDH multiplexer may be deployed at the customer premises, a DLC is intended for service in the CO or a Controlled Environment Vault (CEV) that belongs to the carrier.

Each line 111 may be coupled to other lines and to LEC equipment, CPE and IXC equipment for conveying data. An entry-level path-terminating terminal multiplexer acts as a concentrator of DS1s as well as other tributary signals.

The method is not dependent on monitoring or surveillance techniques used to retrieve alarms and PM parameter data. SONET/SDH network management for SONET/SDH NEs has a number of management interfaces. The predominant interface for a Network Management System (NMS) to an Element Management System (EMS) of SONET/SDH NEs is based on TeleManagement Forum (TMF) standards TMF-814.

SONET/SDH has dedicated Data Communication Channels (DCCs) within the section and line overhead for management traffic. There are three modes used for management, an IP-only stack, using Point-to-Point Protocol (PPP) as a data-link, an Open Systems Interconnection (OSI) only stack, using Link Access Procedures, D-channel (LAP-D) as a data-link, and a dual (IP+OSI) stack using PPP or LAP-D with tunneling functions to communicate between stacks.

SONET/SDH NEs have a large set of standards for PM. The PM criteria allow for monitoring not only the health of individual NEs, but for the isolation and identification of most network defects or outages. Higher-layer network monitoring and management software allows for the proper filtering and troubleshooting of network-wide PM so that defects and outages can be quickly identified and responded to.

The first step in SONET/SDH multiplexing involves generating the lowest level or base signal. In SONET/SDH, the base signal is referred to as Synchronous Transport Signal-level 1, or STS-1, which operates at 51.84 Mbps. Higher-level signals are integer multiples of STS-1, creating the family of STS-N signals. An STS-N signal is composed of N byte-interleaved STS-1 signals. This also includes the optical counterpart for each STS-N signal, designated OC-N. In general, the frame can be divided into two main areas: transport overhead and the Synchronous Payload Envelope (SPE).

SONET/SDH provides overhead information allowing simpler multiplexing and greatly expanded OAM&P capabilities. The overhead information comprises several layers where enough information is contained in the overhead to allow the network to operate and allow OAM&P communications between an intelligent network monitor and controller, and the individual nodes. The different SONET/SDH overhead information includes section overhead, line overhead, STS POH and VT POH.

SONET allows integrated network OAM&P in accordance with single-ended maintenance. One connection can reach all NEs within a given architecture and separate links are not required for each NE. Remote provisioning provides centralized maintenance and reduced travel for maintenance personnel which translates to expense savings.

Section overhead contains nine bytes of the transport overhead accessed, generated, and processed by section-terminating equipment. Section overhead supports functions such as PM (of the STS-N signal), local orderwire, data communication channels to carry OAM&P information and framing.

The overhead information provides a variety of management and other functions such as error performance monitoring, pointer adjustment information, path status, path trace, section trace, remote defect, error, and failure indications, signal labels, new data flag indications, DCCs, Automatic Protection Switching (APS) control, orderwire, synchronization status message and others. Much of the overhead is involved with alarm and in-service monitoring of the particular SONET/SDH sections.

SONET/SDH alarms are defined as anomaly, defect and failure. An anomaly is the smallest discrepancy that can be observed between the actual and desired characteristics of an item. The occurrence of a single anomaly does not constitute an interruption in the ability to perform a required function. A defect is when the density of anomalies has reached a level where the ability to perform a required function has been interrupted. Defects are used as input for PM data, the control of consequent actions and the determination of fault cause. And failure is the inability of a function to perform a required action persisted beyond the maximum time allocated.

The SONET/SDH alarm anomalies, defects and failures include Loss Of Signal (LOS), Out Of Frame (OOF) alignment, Loss Of Frame (LOF) alignment, Loss Of Pointer (LOP), Alarm Indication Signal (AIS), Far End Block Error (FEBE) or Remote Error Indication (REI), Far End Receive Failure (FERF) or Remote Defect Indication (RDI), Remote Failure Indication (RFI), B1 error, B2 error, B3 error, BIP-2 error and Loss of Sequence Synchronization (LSS).

LOS is raised when the synchronous signal (STS-N) level drops below the threshold at which a BER of 1 in $10^3$ is predicted. It may be due to a cut cable, excessive attenuation of the signal, or equipment fault. LOS state clears when two consecutive framing patterns are received and no new LOS condition is detected.

An OOF state occurs when four or five consecutive SONET frames are received with invalid (errored) framing patterns (A1 and A2 bytes). The maximum time to detect OOF is 625 microseconds. OOF state clears when two consecutive SONET frames are received with valid framing patterns.

An LOF state occurs when the OOF state exists for a specified time in milliseconds. LOF state clears when an in-frame condition exists continuously for a specified time in milliseconds.

An LOP state occurs when N consecutive invalid pointers are received or N consecutive New Data Flags (NDFS) are received (other than in a concatenation indicator), where N=8, 9, or 10. LOP state clears when three equal valid pointers or three consecutive AIS indications are received. LOP can also be identified as follows: STS path Loss Of Pointer (SP-LOP), VT path Loss Of Pointer (VP-LOP).

The AIS is an all 1's characteristic or adapted information signal. It is generated to replace the normal traffic signal when it contains a defect condition in order to prevent consequential downstream failures being declared or alarms being raised. AIS can also be identified as a Line Alarm Indication Signal (AIS-L), an STS Path Alarm Indication Signal (SP-AIS) and a VT Path Alarm Indication Signal (VP-AIS).

The REI is an indication returned to a transmitting node (source) that an errored block has been detected at the receiving node (sink). REI can also be identified as a Line Remote Error Indication (REI-L), an STS Path Remote Error Indication (REI-P) and a VT path Remote Error Indication (REI-V).

The RDI is a signal returned to the transmitting terminating equipment upon detecting a loss of signal, loss of frame, or AIS defect. RDI can also be identified as a Line Remote Defect Indication (RDI-L), an STS Path Remote Defect Indication (RDI-P) and a VT path Remote Defect Indication (RDI-V).

The RFI is a defect that persists beyond the maximum time allocated to the transmission system protection mechanisms. When this situation occurs, an RFI is sent to the far end and will initiate a protection switch if this function has been enabled. RFI can also be identified as a Line Remote Failure Indication (RFI-L), an STS Path Remote Failure Indication (RFI-P) and a VT path Remote Failure Indication (RFI-V).

The B1 error is a parity error evaluated by byte B1 (BIP-8) of an STS-N and are monitored. If any of the eight parity checks fail, the corresponding block is assumed to be in error. The B1 error monitors bit errors between two adjacent Section Terminating Equipments (STEs), such as a regenerator. Differences in B1 indicate the occurrence of section-level bit errors.

The B2 error is a parity error evaluated by byte B2 (BIP-24*N) of an STS-N and are monitored. If any of the 24*N parity checks fail, the corresponding block is assumed to be in error. The B2 error monitors bit errors between two adjacent Line Terminating Equipments (LTEs), such as an ADM or DCS. Differences in B2 indicate the occurrence of line-level bit errors.

The B3 error is a parity error evaluated by byte B3 (BIP-8) of a VT-N (N=3, 4) and are monitored. If any of the eight parity checks fail, the corresponding block is assumed to be in error. The B3 error monitors bit errors between two adjacent Path Terminating Equipments (PTEs), such as two router POS interfaces. Differences in B3 indicate the occurrence of path-level bit errors.

The BIP-2 error is a parity error contained in bits 1 and 2 (BIP-2: bit interleaved parity-2) of byte V5 of a VT-M (M=11, 12, 2) are monitored. If any of the two parity checks fail, the corresponding block is assumed to be in error.

The LSS is a bit error measurement using pseudo-random sequences and can only be performed if the reference sequence produced on the synchronization receiving side of the test set-up is correctly synchronized to the sequence coming from the object under test. To achieve compatible measurement results, it is necessary to specify that the sequence synchronization characteristics. Sequence synchronization is considered to be lost and resynchronization is started if the bit error ratio is greater than or equal to 0.20 during an integration interval of 1 second. It can be unambiguously identified that the test sequence and the reference sequence are out of phase.

Figure 2B:
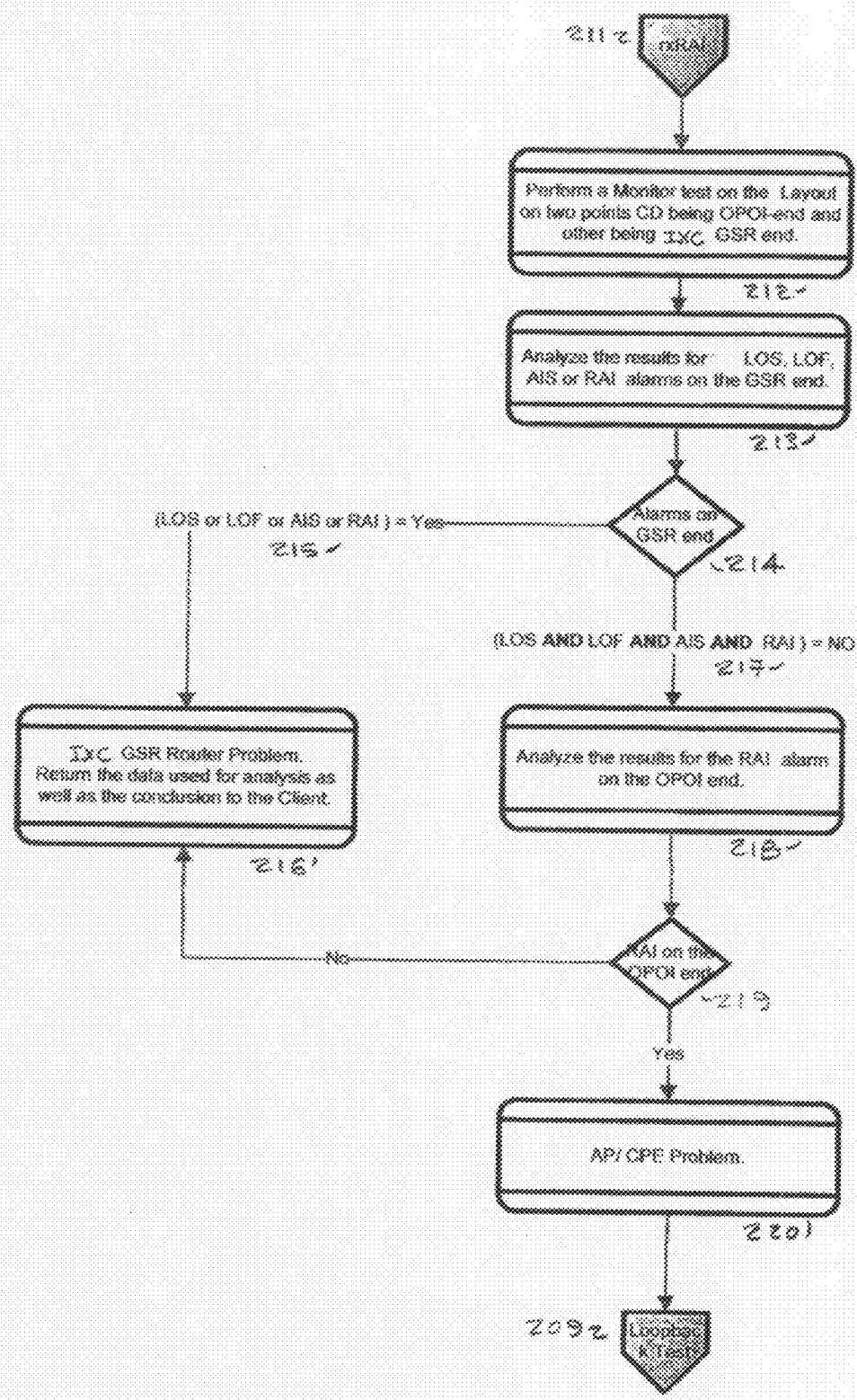
FIG. 2B is an exemplary method for isolating problems between IXC and CPE routers based on rxRAI (Remote Alarm Indication has been received) using hard circuit alarms.
Figure 2C:
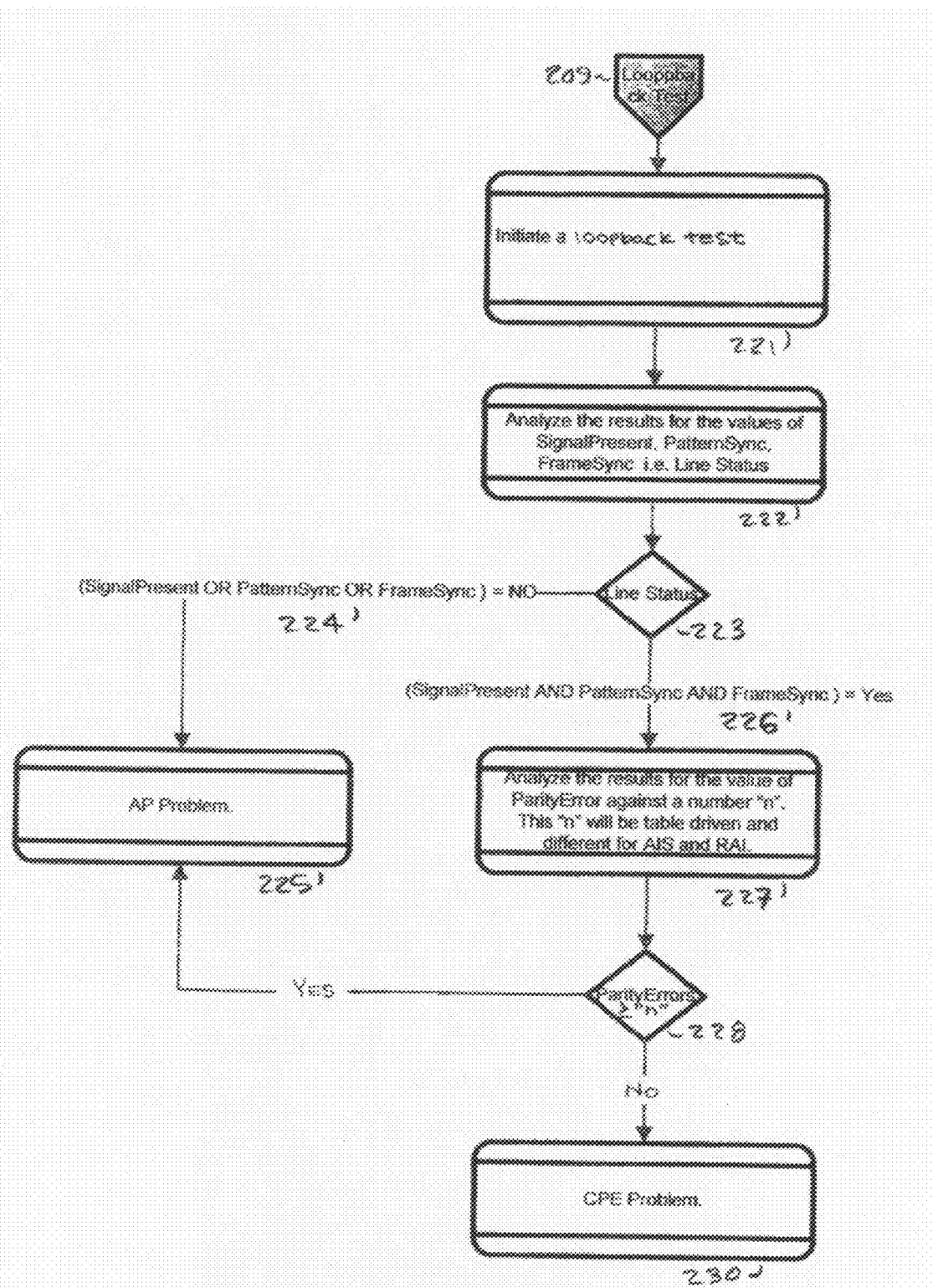
FIG. 2C is an exemplary method for isolating problems between CPE and the LEC/AP.
Figure 2D:
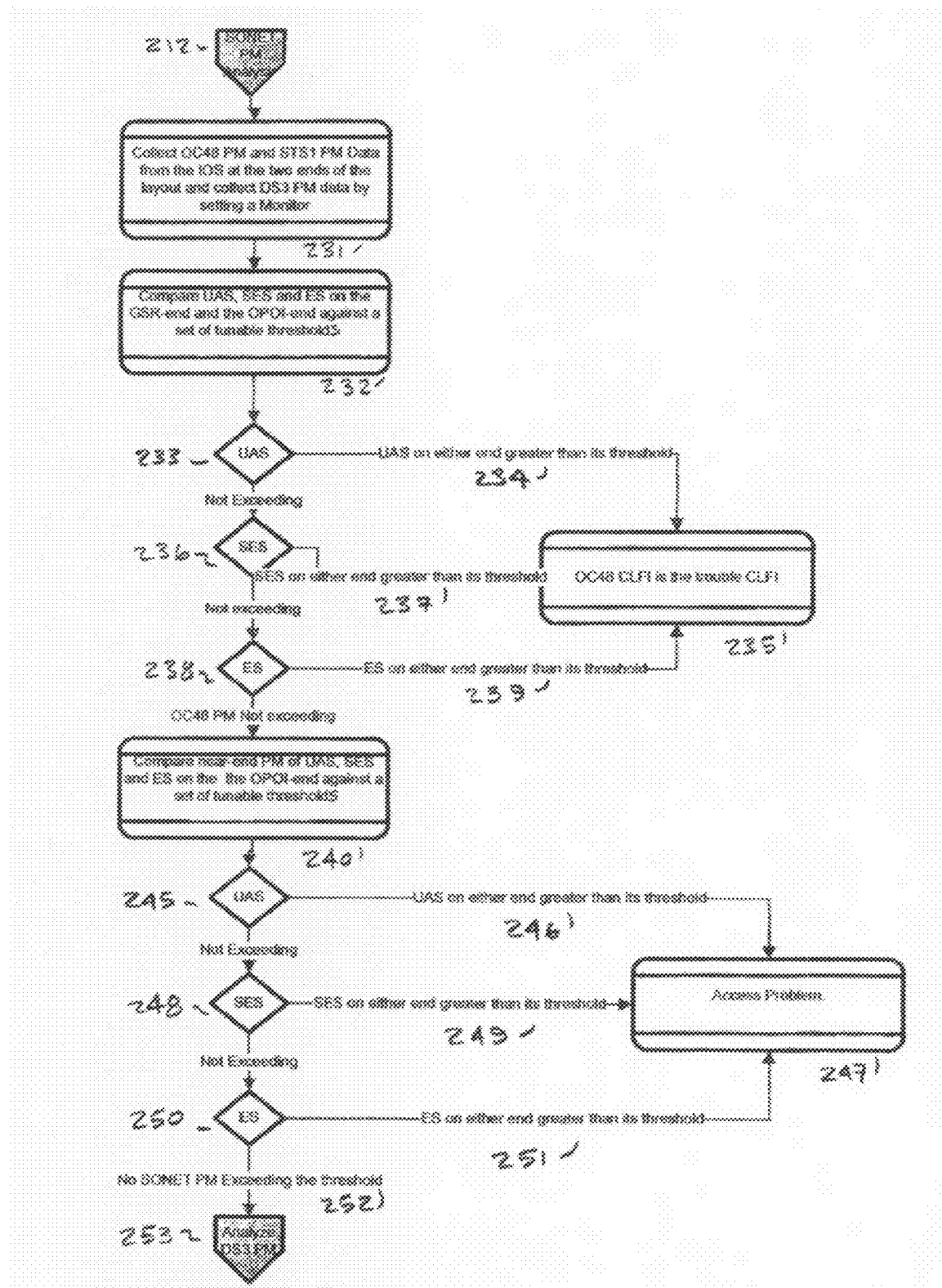
FIG. 2D is an exemplary method for analyzing OC-N and STS-N PM parameter data to isolate problems on a DSX circuit.

Using the method of the invention, Customer Care-Service Assurance (CC-SA) teams can diagnose problems on DS3 circuits (FIG. 1) associated with a VPN and an MIS/PNT service. FIG. 2 shows the method.

The method begins (FIG. 2A) with monitoring the alarms on an OC-N line and STS-N to isolate DSX circuit problems embedded in a SONET/SDH transport (step 201). A surveillance system via the EMS of the NEs surveils SONET/SDH NEs and determines whether alarms are present. If OC-N alarms are present (step 202), the CLFI (Common Language Facility Identification) within each alarm are cross-referenced in conjunction with the Target Identifier/Access Identifier (TID/AID) of the NE experiencing the alarm for location identification (step 203). If there are no OC-N alarms, a determination is made whether there are any STS-N alarms (step 204). If STS-N paths are experiencing problems, the CLFI of the STS-N are cross-referenced in conjunction with the TID/AID of the NE to identify STS-N direction (step 205).

If there are no OC-N or STS-N alarms present, the IXC end 105 and OPOI end 109 GSRs are checked for receiver is getting an Alarm Indication Signal (rxAIS) and/or receiver has Remote Alarm Indication (rxRAI) (step 206). If an rxAIS is present (step 207), a problem is being experienced by either the AP or the CPE (step 208). If an rxAIS is present at either GSR, a loopback test is performed (step 209).

An rxAIS indicates the occurrence of an error on the E3 line upstream from the equipment that connects to the port. The AIS alarm is declared at the detection of an AIS signal (all 1's) at the input. The AIS alarm still exists after the LOF alarm is declared active. The unframed nature of the all 1's signal causes the signal to remain. The AIS alarm clears when the LOF alarm clears.

If no rxAIS alarms are present, both GSRs are checked for rxRAI alarms (step 210). If an rxRAI is present, an investigation is performed to isolate whether the problem is being experience between the IXC and LEC/AP (step 211). If the GSRs 105, 109 are not experiencing rxAIS or rxRAI alarms, the path 101 is free of hard alarms (step 212). The path 101 may have intermittent failures due to errors/PM problems.

An rxRAI means that the far-end equipment has a problem with the signal that the far-end equipment receives from the local equipment. The RAI alarm is declared when the A-bit (bit 11 in the G.751 frame) is set to one. The RAI alarm is not declared at the detection of an LOS or LOF alarm.

To isolate whether a problem is occurring between the IXC and LEC/AP (FIG. 2B), a two-prong test is performed between the customer OPOI end 107 and the IXC GSR end 105 (step 212).

SONET/SDH NEs are monitored for LOS, LOF, AIS or RAI alarms on the IXC GSR end 105 (step 213). If alarms are originating from the IXC GSR end 105 (steps 214, 215), $$LOS + LOF + AIS + RAI = \text{Boolean true},\quad(1)$$

a problem is being experienced by the IXC GSR 105. The data used for analysis and the conclusion is forwarded to the client (step 216), where the client is the user who has requested the analysis. If (1) is not true, and if (step 217), $$LOS \cdot LOF \cdot AIS \cdot RAI = \text{Boolean false},\quad(2)$$

the results for the RAI alarm are analyzed at the customer OPOI end 109 (step 218). If the RAI alarm is not at the customer OPOI end 109 (step 219), the problem is at the IXC GSR end 105 (step 216).

If the RAI alarm originates at the customer OPOI end 109 (step 220), the problem is manifesting itself at the customer AP/CPE and a loopback test is performed (step 209).

A loopback test (FIG. 2C) is a software method which feeds received data back to a sender. It is used to debug a physical connection problem. The test may be configured to send specific patterns on an interface and can detect the reception of this signal on the same port. The loopback test tests the circuit between two points in different locations, for example, the two GSRs 105, 109, by applying a test signal on the circuit in one location and having the network device at the other location send a signal back through the circuit. If the device receives its own signal back, this proves that the circuit is functioning.

A loopback test is initiated (step 221) using a pattern of $2^{23}-1$. Where $2^{23}-1$ represents an algorithm that produces a weighted DS3 signal in a particular pattern. This pattern can be detected and BER measurements made. The results are analyzed for SignalPresent, PatternSync, FrameSync and others for line status (step 222). Signal Present is an indication that a digital signal is present. Pattern Sync is an indication that the test has detected the transmitted pattern and is now in synchronization with that pattern. Frame Sync is an indication that DS3 framing has been found in the received signal and is now in synchronization with that framing. If line status indicates (steps 223, 224), $$SignalPresent + PatternSync + FrameSync = \text{Boolean false},\quad(3)$$

the problem is at the AP (step 225). If line status indicates (steps 223, 226), $$SignalPresent \cdot PatternSync \cdot FrameSync = \text{Boolean true},\quad(4)$$

the results/monitored data are analyzed for the value of ParityError (step 227).

ParityError is compared with a predetermined value n. The n value is table driven and tunable, and may be different for AIS and RAI.

If the number of ParityErrors is greater than or equal to the predetermined value n (step 228), the problem is at the AP (step 225). If the number of ParityErrors is less than the predetermined value n, the problem is at the CPE (step 230).

In the absence of hard alarms present in SONET/SDH PM data (FIG. 2D), the OC-N PM data and STS-N data is acquired from the customer GSR 109 and the IXC GSR 105 (step 231). IOS is an Intelligent Optical Switch. The parameters Unavailable Seconds (UAS), Severely Errored Seconds (SES) and Errored Seconds (ES) for the IXC GSR 105 and the OPOI customer GSR 109 are compared with respective predetermined thresholds (step 232). Values of 7, 3 and 200 seconds may be used for UAS, SES and ES respectively for an OC-48 rate.

UAS is the number of seconds during which the signal is alarmed or experiencing an Equivalent BER (EBER) exceeding 1 in $10^{-3}$ for 10 consecutive seconds. An EBER is the equivalent rate at which the customer will experience errors as a ratio, for example, 1 in $10^{-3}$. SES is a one second interval during which the EBER has exceeded 1 in $10^{-3}$. ES is at least a one second interval during which at least one error occurred.

If the UAS, SES or ES for an OC-48 retrieved from IOS on either the IXC GSR 105 end or the OPOI GSR 109 end is greater than its respective threshold (steps 233, 234, 236, 237, 238, 239), the OC-N CLFI is the trouble facility and is the root cause of the problem on the DS3 circuit (step 235).

If none of the above comparisons of OC-N PM data exceeded their respective thresholds, a comparison test between near-end STS-1 PM of UAS, SES and ES at the OPOI end and respective predetermined thresholds is performed (step 240).

If the near-end UAS, SES or ES for STS-1 retrieved from IOS on either the IXC GSR 105 or the OPOI GSR 109 is greater than its respective threshold (steps 245, 246, 248, 249, 250, 251), the problem is an access problem on an STS1 (either the LEC/AP or Customer Premises) (step 247).

If neither of the above comparisons of near-end STS-1 PM exceeded their respective thresholds, meaning that no SONET PM data is exceeding its respective threshold (step 252), the DSX PM data is analyzed (step 253).

The near-end errors at the IXC GSR end 105 and at the OPOI end 109 are compared with each other (FIG. 2E) (step 254). If the errSecC at the OPOI end 109 is greater than or equal to the errSecC at the IXC GSR end 105 (steps 255, 256), the problem is at the AP/CPE (step 257). If the errSecC at the OPOI end 109 is less than the errSecC at the IXC GSR end 105 (steps 255, 258), the problem is at the IXC GSR (step 259).

These parameters are fully defined in T1.231.03-2003 "DS3-Layer 1 In-Service Digital Transmission Performance Monitoring". Errored Second Type A (ESAP-P or ESACP-P) is a count of seconds containing exactly 1 parity error, with no Severely Errored Frame (SEF) or AIS defects. Errored Second Type B (ESBP-P or ESBCP-P) is a count of seconds containing more than 1, but less than x parity errors with no SEF or AIS defects. For 45 Mbps signals x=45. Errored Second Type C or Severely Errored Second (SESP-P or SESCP-P) is a count of seconds containing more than x parity errors, or 1 or more SEF defects, or 1 or more AIS defects.

The near-end errSecB errors at the IXC GSR end 105 are compared with the near-end errSecB errors at the OPOI end 109. If the errSecB at the OPOI end 109 is greater than or equal to the errSecB at the IXC GSR end 105 (steps 260, 261), the problem is at the AP/CPE (step 257). If the errSecB at the OPOI end 109 is less than the errSecB at the IXC GSR end 105 (steps 260, 262), the problem is at the IXC GSR (step 259).

The near-end errSecA errors at the IXC GSR end 105 are compared with the near-end errSecA errors at the OPOI end 109. If the errSecA at the OPOI end 109 is greater than or equal to the errSecA at the IXC GSR end 105 (steps 263, 264), the problem is at the AP/CPE (step 257). If the errSecA on the OPOI end 109 is less than the errSecA at the IXC GSR end 105 (steps 263, 265), the problem is at the IXC GSR (step 259).

If there are no near-end errors of any type, a check is performed at either the OPOI end 109 or the IXC GSR end 105 if a FEBE is being transmitted (step 266).

FEBE errors, also referred to as Remote Error Indication (REI), are experienced on DSX as well as on SONET/T1s. Each terminating device, for example, Muxs 113 in this example, monitors the incoming signal for path errors. If an error is detected on the incoming DSX, the terminating element transmits a FEBE bit on the outgoing direction of the DSX. Network monitoring equipment located anywhere along the path measures the FEBEs in each direction to gauge the quality of the circuit while in service. The terminating device sends the FEBE error signal outbound to alert further devices there are problems. Errors are generated on the incoming side of a loop, the device terminating that end picks up the errors, and transmits a FEBE error message on the outgoing side. This specific setup of error reporting causes confusion for technicians performing repairs. An ATM interface reports detected C-bit parity errors back to the source via a FEBE. An indication is sent to a transmitting node that a flawed block has been detected at the receiving node.

A FEBE in C-bit parity is a parity violation detected at the far-end terminal and transmitted back to the near-end terminal. A maintenance cell indicates that an error occurred with a data block at the far end of the link. This cell then sends a message back to the near-end.

If the FEBE C at the OPOI end 109 is greater than or equal to the FEBE C at the IXC GSR end 105 (steps 267, 268), the problem is at the AP/CPE (step 269). If the FEBE C at the OPOI end 109 is less than the FEBE C at the IXC GSR end 105 (steps 267, 270), the problem is at the IXC GSR (step 271). If there are no near-end FEBE C errors, the near-end FEBE B errors at the IXC GSR end 105 are compared with the near-end FEBE B errors at the OPOI end 109. If the FEBE B at the OPOI end 109 is greater than or equal to the FEBE B at the IXC GSR end 105 (steps 272, 273), the problem is at the AP/CPE (step 269). If the FEBE B at the OPOI end 109 is less than the FEBE B at the IXC GSR end 105 (steps 272, 274), the problem is at the IXC GSR (step 271). If there are no near-end FEBE B errors, the near-end FEBE A errors at the IXC GSR end 105 are compared with the near-end FEBE A errors at the OPOI end 109. If the FEBE A at the OPOI end 109 is greater than or equal to the FEBE A at the IXC GSR end 105 (steps 275, 276), the problem is at the AP/CPE (step 269). If the FEBE A at the OPOI end 109 is less than the FEBE A at the IXC GSR end 105 (steps 275, 277), the problem is at the IXC GSR 105 (step 271).

If there are no near-end FEBE C, B or A errors, no problems are being experienced in the SONET/SDH path (step 278).

If a problem is manifesting itself at the AP/CPE, a loopback test is initiated. This method allows isolation of problems between AP network and CPE.

One or more embodiments of the present invention have been described. Nevertheless, it will be understood that various modifications may be made without departing from the spirit and scope of the invention. Accordingly, other embodiments are within the scope of the following claims.

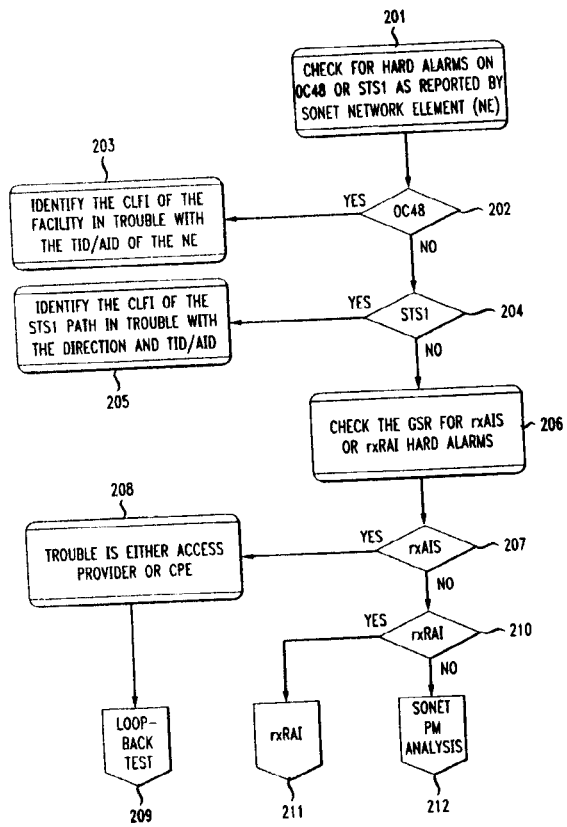

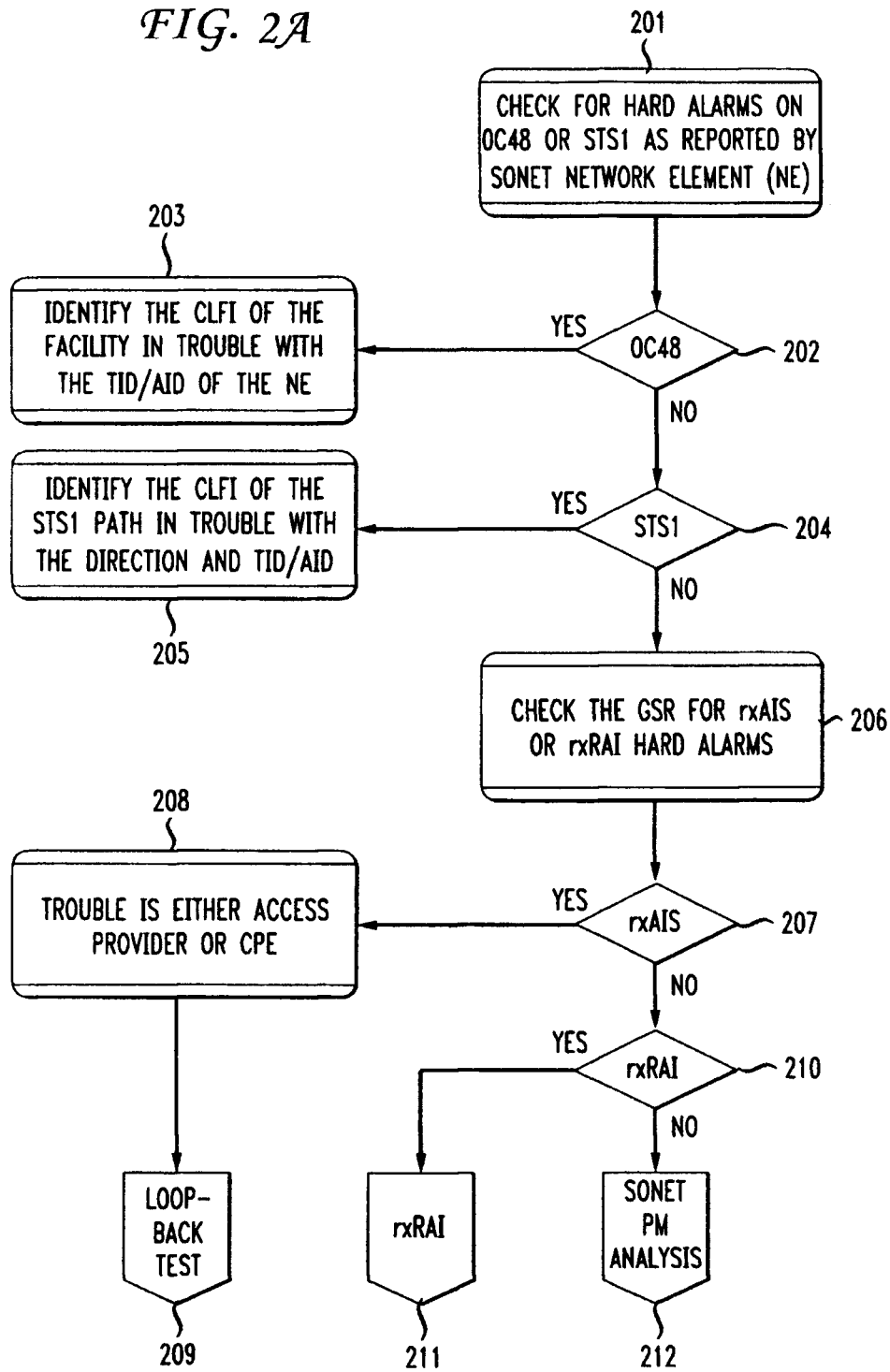

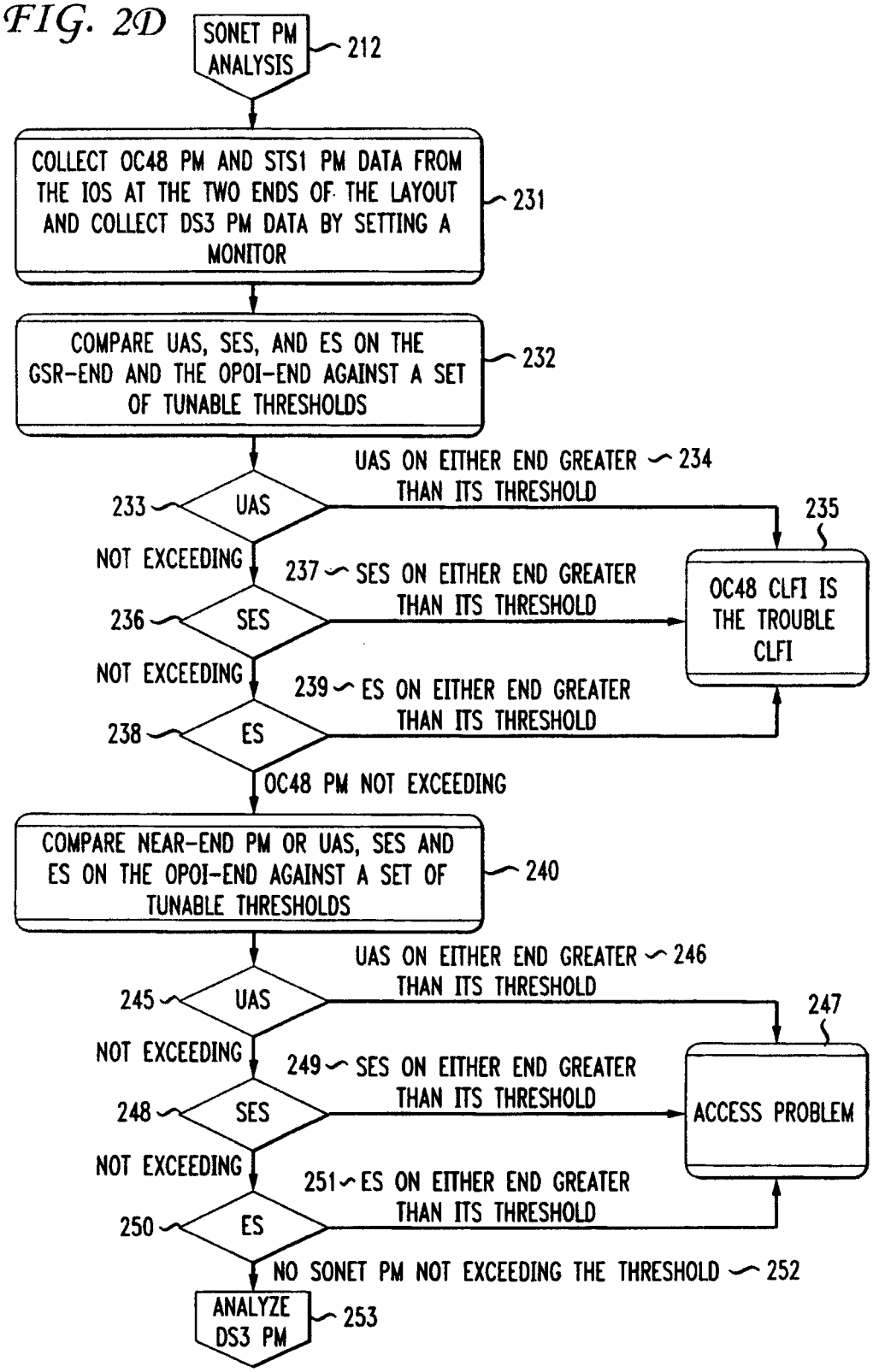

What is claimed is:

1. A method for detecting a problem caused by equipment failure in a digital signal circuit transported in synchronous optical networking paths comprising:
   acquiring alarm data from network elements in a defined synchronous optical networking path between an interexchange carrier router and a customer premises equipment router including an access provider;
   acquiring performance monitoring parameter data from the network elements in the defined synchronous optical networking path;
   based on the alarm data and the performance monitoring parameter data at optical carrier-N, synchronous transport signal—level N and digital signal level X levels, isolating the interexchange carrier network elements, the access provider network elements, and customer premises equipment network elements;
   analyzing the optical carrier-N, synchronous transport signal—level N and digital signal level X alarm data to isolate the problem when the problem occurs on a digital signal level X circuit of the digital signal circuit;
   analyzing the optical carrier-N and synchronous transport signal—level N performance monitoring parameter data to isolate the problem when the problem occurs on the digital signal level X circuit;
   analyzing digital signal level X performance monitoring parameter data to isolate the problem when the problem occurs on the digital signal level X circuit;
   analyzing intereXchange carrier alarm data including loss of signal, loss of frame alignment, alarm indication signal, and remote alarm indication signals to isolate the problem when the problem occurs on the interexchange carrier router of the digital signal circuit; and
   determining the root cause of the problem.

2. The method according to claim 1 wherein isolating the interexchange carrier network elements, the access provider network elements, and the customer premises equipment network elements further comprises if a synchronous optical networking network element initiates an alarm, identifying the facility where the synchronous optical networking network element initiating the alarm is located.

3. The method according to claim 2 further comprising if a synchronous transport signal—level 1 error is present in the performance monitoring parameter data, identifying the facility in the path where the alarm originated.

4. The method according to claim 3 further comprising if the interexchange carrier router indicates reception of an alarm indication signal, initiating a loopback test for that digital signal level X circuit to isolate the problem.

5. The method according to claim 4 further comprising if the interexchange carrier router indicates reception of a remote alarm indication signal, isolating where the problem occurred between the intereXchange carrier router and customer premises equipment network elements router of the digital signal circuit.

6. The method according to claim 5 further comprising if a path network element does not initiate an alarm, or there are no synchronous optical networking or a synchronous transport signal—level 1 errors present in the performance monitoring parameter data, or the interexchange carrier router does not initiate an alarm indication signal, or the interexchange carrier router does not initiate a remote alarm indication, performing a synchronous optical networking performance monitoring parameter data analysis to isolate the problem occurring on the digital signal level X circuit of the digital signal circuit.

7. The method according to claim 2 wherein if a synchronous optical networking network element initiates an alarm, using the target identifier/access identifier of the alarmed network element for identification.

8. The method according to claim 2 wherein if a synchronous transport signal—level 1 path is experiencing a problem, cross-referencing the facility of the synchronous transport signal—level N path with the target identifier/access identifier of the network element to identify synchronous transport signal—level N direction.

9. The method according to claim 5 wherein isolating where the problem occurred between the interexchange carrier and customer premises equipment network elements routers further comprises:

if there is an interexchange carrier router alarm for one or more loss of signal, loss of frame, alarm indication signal, or remote alarm indication alarms, identifying the interexchange carrier router as experiencing the problem;

if there is no interexchange carrier router alarm for a loss of signal, loss of frame, alarm indication signal, or remote alarm indication alarm, analyzing the customer router for a remote alarm indication alarm;

if there are no customer router remote alarm indication alarms, identifying the interexchange carrier router as experiencing the problem; and if there is a customer router remote alarm indication alarm, identifying the customer premises equipment as experiencing the problem.

10. The method according to claim 9 wherein if there is a customer router remote alarm indication alarm, performing a loopback test at the customer premises equipment further comprising:

initiating a loopback test from the customer premises equipment including a predetermined pattern for signalpresent, patternsync and framesync to indicate line status;

analyzing returned values of signalpresent, patternsync and framesync to indicate line status;

if the values for signalpresent, patternsync and framesync return false, identifying the problem as occurring at the access provider;

if the values for signalpresent, patternsync and framesync return true, analyzing a parityerror value against a predetermined parity error value n;

if the parityerror value is greater than or equal to the predetermined parity error value n, identifying the problem as occurring at the access provider; and if the parityerror value is less than the predetermined parity error value n, identifying the problem as occurring at the customer premises equipment.

11. The method according to claim 6 wherein performing a synchronous optical networking performance monitoring parameter data analysis to isolate the problem occurring on the digital signal level X circuit further comprises:

comparing unavailable seconds, severely errored seconds and errored seconds for the interexchange carrier router and the customer router with respective predetermined thresholds;

if the interexchange carrier router unavailable seconds is greater than its respective threshold, or if the customer router unavailable seconds is greater than its respective threshold, identifying the facility being the root cases as a problem facility;

if the interexchange carrier router severely errored seconds is greater than its respective threshold, or if the customer router severely errored seconds is greater than its respective threshold, identifying the facility being the root case as the problem facility;

if the interexchange carrier router errored seconds is greater than its respective threshold, or if the customer router errored seconds is greater than its respective threshold, identifying the facility being the root case as the problem facility;

if the interexchange carrier router unavailable seconds or the customer router unavailable seconds is less than or equal to its respective threshold, or if the interexchange carrier router severely errored seconds or the customer router severely errored seconds is less than or equal to its respective threshold, or if the interexchange carrier router errored seconds or the customer router errored seconds is less than or equal to its respective threshold, comparing near-end unavailable seconds, severely errored seconds and errored seconds for the interexchange carrier router and the customer router with respective predetermined threshold;

if the near-end interexchange carrier router unavailable seconds is greater than its respective threshold, or if the near-end customer router unavailable seconds is greater than its respective threshold, identifying the problem as occurring on the access provider;

if the near-end interexchange carrier router severely errored seconds is greater than its respective threshold, or if the near-end customer router severely errored seconds is greater than its respective threshold, identifying the problem as occurring on the access provider;

if the near-end interexchange carrier router errored seconds is greater than its respective threshold, or if the customer near-end router errored seconds is greater than its respective threshold, identifying the problem as occurring on the access provider; and if the near-end interexchange carrier router unavailable seconds or the near-end customer router unavailable seconds is less than or equal to its respective threshold, or if the near-end interexchange carrier router severely errored seconds or the near-end customer router errored seconds is less than or equal to its respective threshold, or if the near-end interexchange carrier router errored seconds is less than or equal to its respective threshold, determining no synchronous optical networking performance monitoring parameter data exceeded their respective threshold.

12. The method according to claim 11 wherein the predetermined thresholds for the interexchange carrier router unavailable seconds, severely errored seconds and errored seconds are 7, 3 and 200 seconds respectively.

13. The method according to claim 11 wherein the predetermined thresholds for the customer router unavailable seconds, severely errored seconds and errored seconds are 7, 3 and 200 seconds respectively.

14. The method according to claim 11 wherein determining no synchronous optical networking performance monitoring exceeded their respective thresholds further comprises:

comparing errSecC, errSecB and errSecA at the interexchange carrier router and customer router wherein:

if the customer router errSecC is greater than or equal to the interexchange carrier router errSecC, identifying a problem at the customer router;

if the customer router errSecC is less than the interexchange carrier router errSecC, identifying a problem at the interexchange carrier router;

if the customer router errSecB is greater than or equal to the interexchange carrier router errSecB, identifying a problem at the customer router;

if the customer router errSecB is less than the interexchange carrier router errSecC, identifying a problem at the interexchange carrier router;

if the customer router errSecA is greater than or equal to interexchange carrier router errSecC, identifying a problem at the customer router;

if the customer router errSecA is less than the interexchange carrier router errSecC, identifying a problem at the interexchange carrier router; and if comparing errSecC, errSecB and errSecA show no errors, comparing remote error indication C, remote error indication B and remote error indication A for the intereXchange carrier router and customer router wherein:

if the customer router remote error indication C is greater than or equal to the interexchange carrier router remote error indication C, identifying a problem at the customer router;

if the customer router remote error indication C is less than the interexchange carrier router remote error indication C, identifying a problem at the interexchange carrier router;

if the customer router remote error indication B is greater than or equal to Interexchange Carrier router remote error indication B, identifying a problem at the customer router;

if the customer router remote error indication B is less than the interexchange carrier router remote error indication B, identifying a problem at the interexchange carrier router;

if the customer router remote error indication A is greater than or equal to the interexchange carrier router remote error indication A, identifying a problem at the customer router;

if the customer router remote error indication A is less than the interexchange carrier router remote error indication A, identifying a problem at the interexchange carrier router; and if comparing remote error indication C, remote error indication B and remote error indication A show no errors, determining that there are no problems on the defined synchronous optical networking network path.

15. A method that provides service assurance of a digital signal circuit circuits transported in synchronous optical networking paths comprising:

identifying alarms at optical carrier-N, synchronous transport signal—level N or digital signal level X levels from network elements in a defined synchronous optical networking path between an interexchange carrier router and a customer premises equipment router;

isolating a problem when the problem occurs between the interexchange carrier, access provider network and customer premises equipment of the digital signal circuit;

isolating the problem when the problem occurs between the customer premises equipment router and a local exchange provider/application provider of the digital signal circuit; and isolating the problem when the problem occurs on the interexchange carrier router based on analyzing interexchange carrier alarm data including loss of signal, loss of frame alignment, alarm indication signal, and remote alarm indication signals.

16. The method according to claim 15 further comprising isolating the problem when the problem occurs between the interexchange carrier and customer routers based on a receiver having remote alarm indication using hard circuit alarms.

17. The method according to claim 16 further comprising isolating the problem when the problem occurs between the customer router and the local exchange provider/application provider.

18. The method according to claim 17 further comprising analyzing optical carrier-N and synchronous transport signal—level N performance monitoring parameter data to isolate the problem when the problem occurs on a digital signal level X circuit.

19. The method according to claim 18 further comprising analyzing digital signal level X performance monitoring parameters to isolate the problem when the problem occurs on the digital signal level X circuit.

* * * * *

UNITED STATES PATENT AND TRADEMARK OFFICE
CERTIFICATE OF CORRECTION

PATENT NO. : 7,933,209 B2
APPLICATION NO. : 12/152563
DATED : April 26, 2011
INVENTOR(S) : Abidi et al.

Figure 2E:
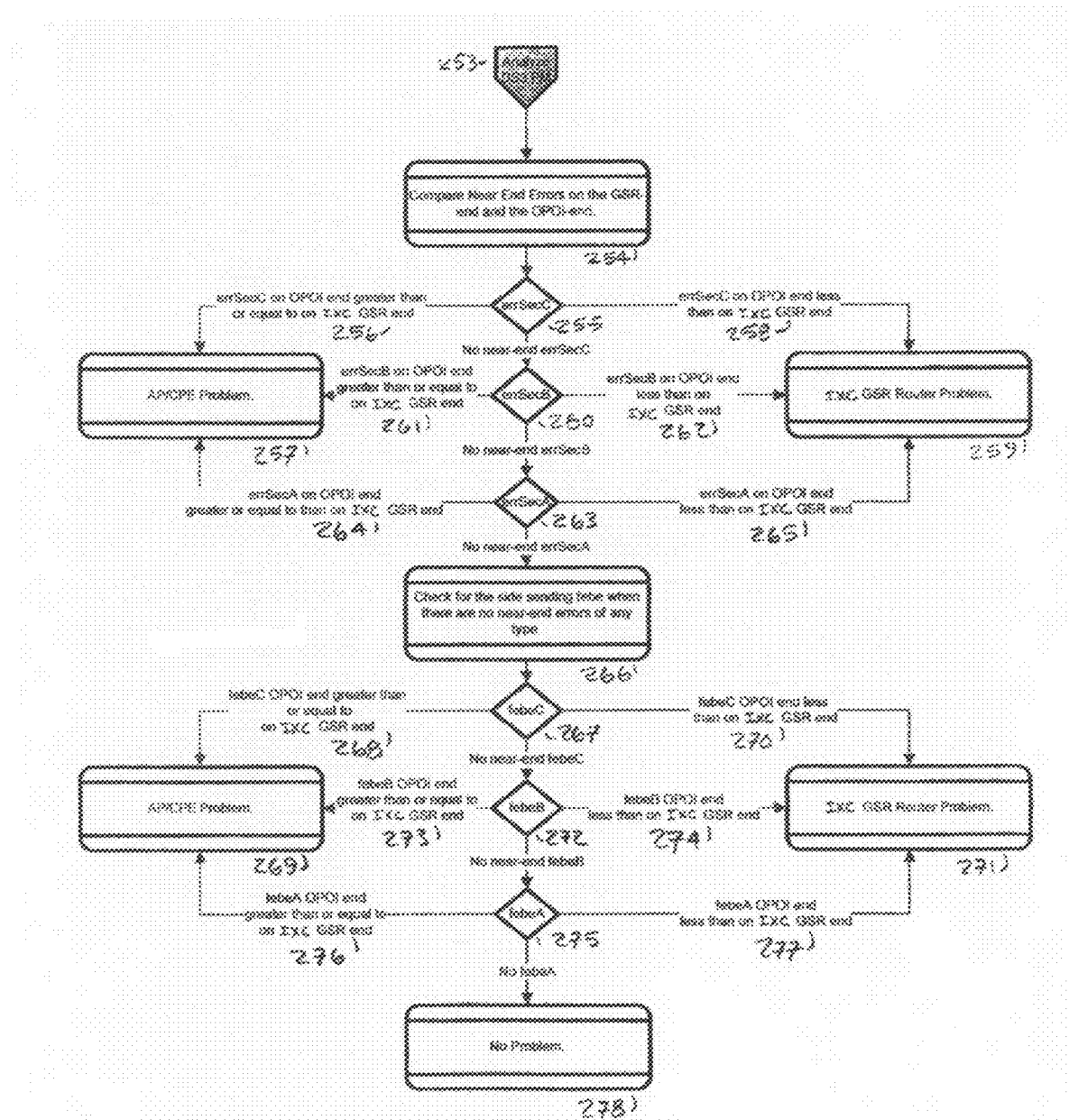
FIG. 2E is an exemplary method for analyzing DSX PM parameters to isolate problems on DSX circuits.
Figure 1:
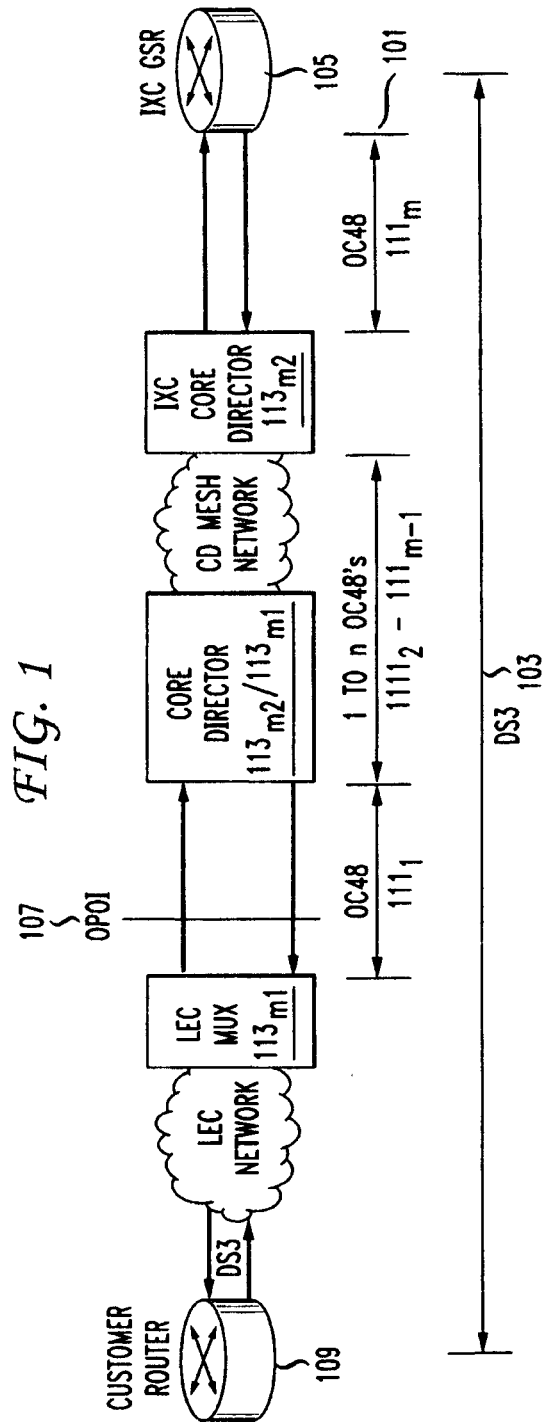
Figure 2:
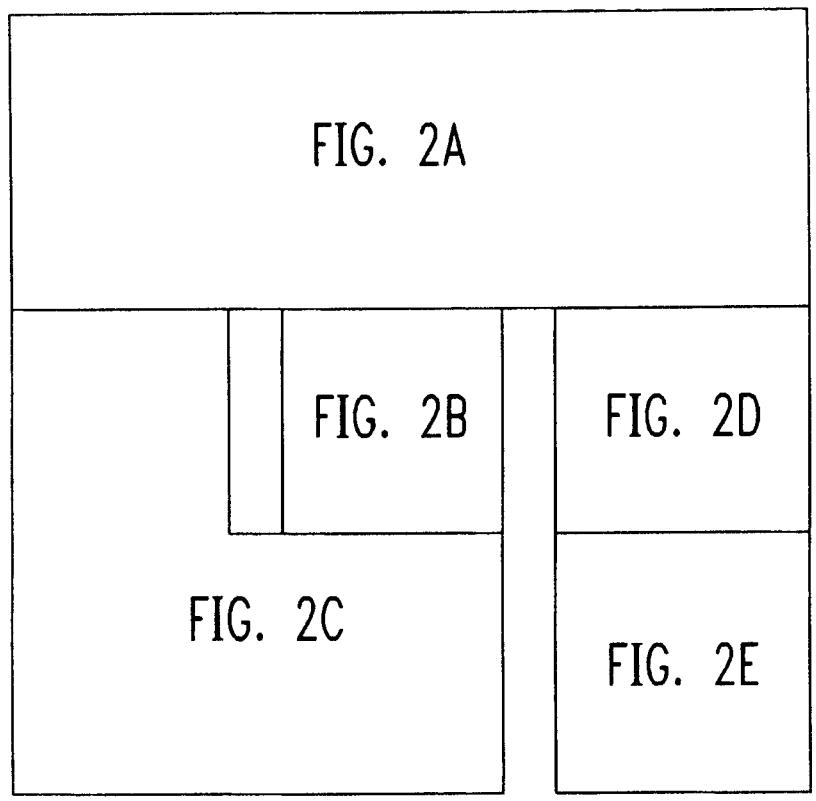
FIG. 2 is an exemplary method that provides Service Assurance (SA) of DSX circuits embedded in SONET/SDH transports.
Figure 2B:
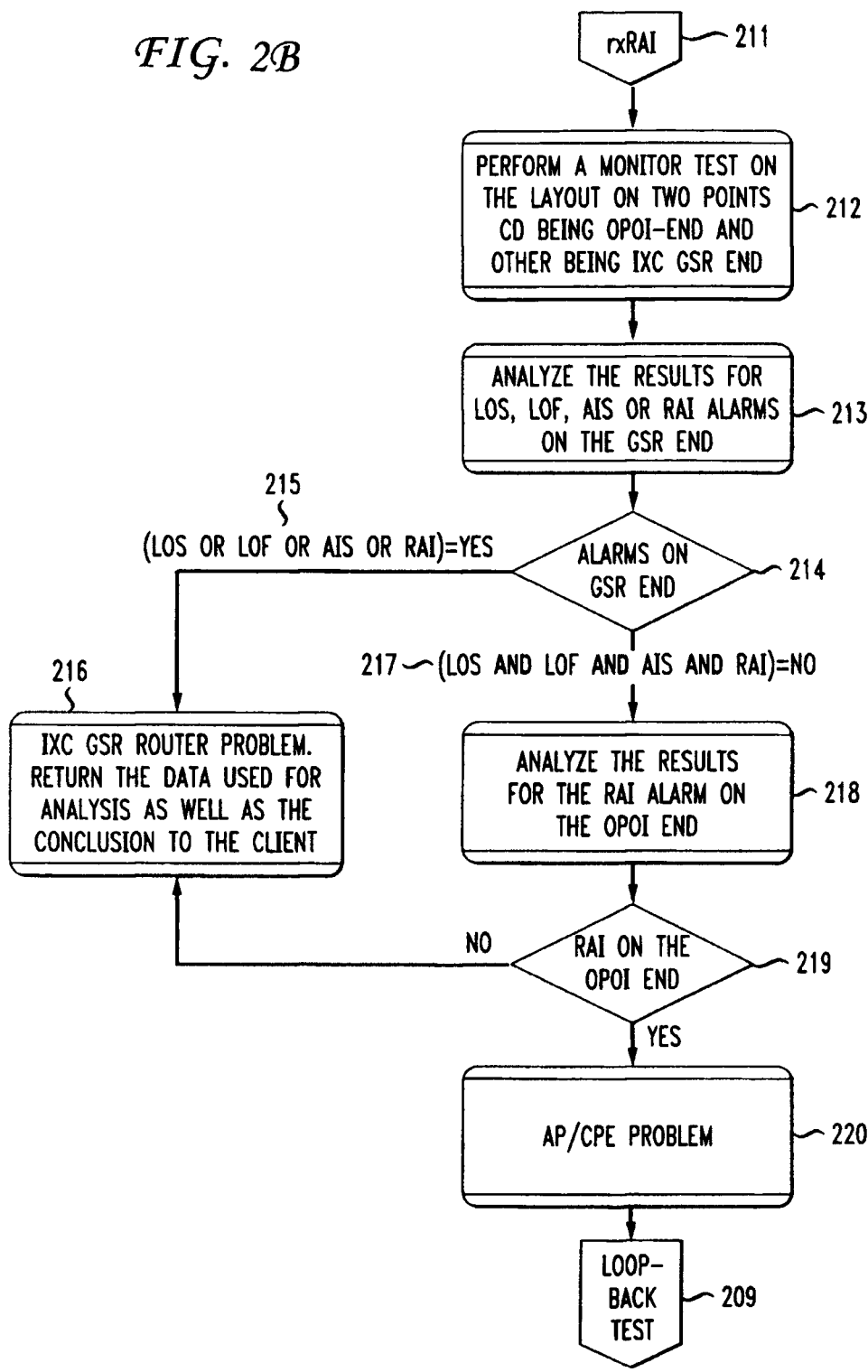
Figure 2C:
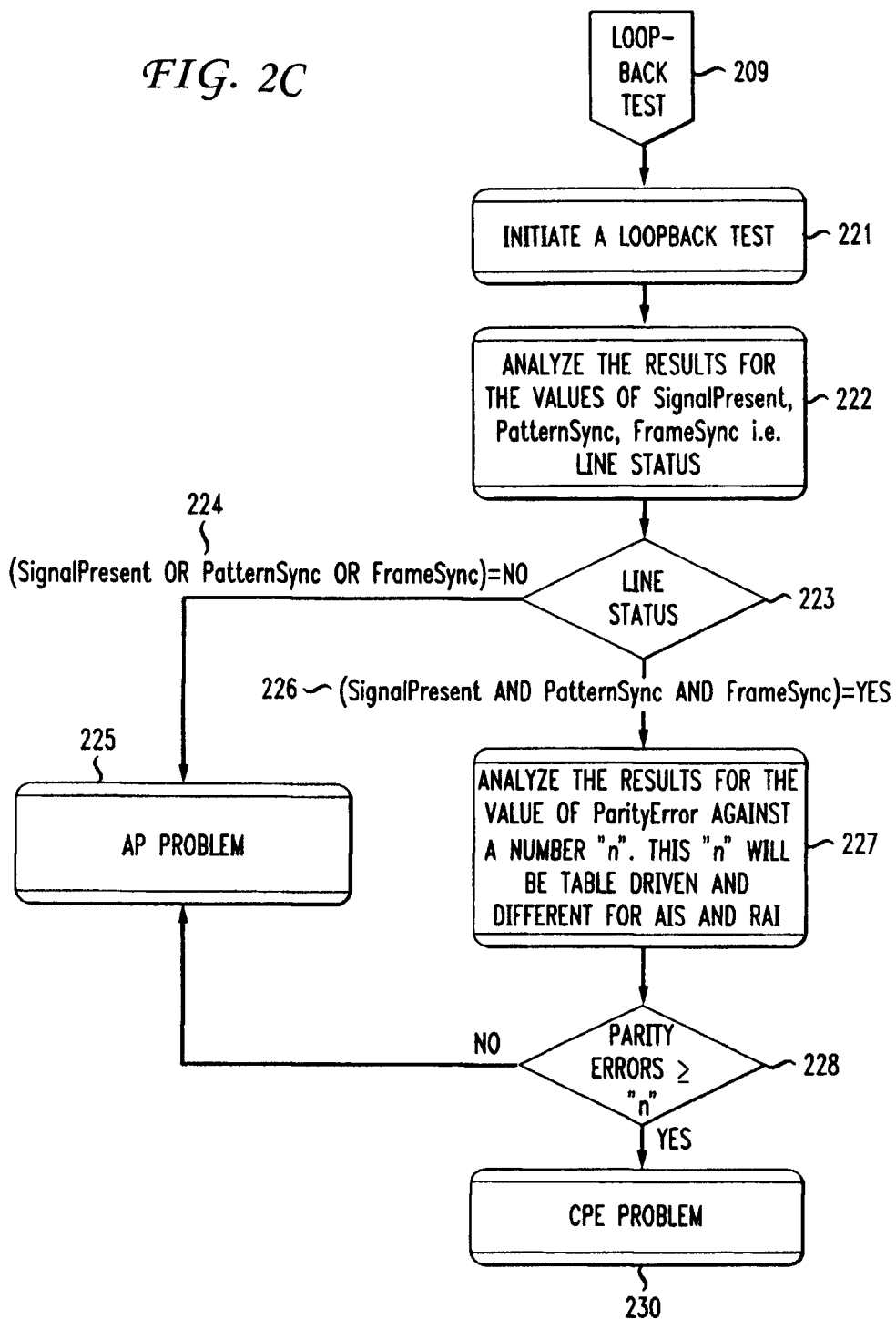
Figure 2E:
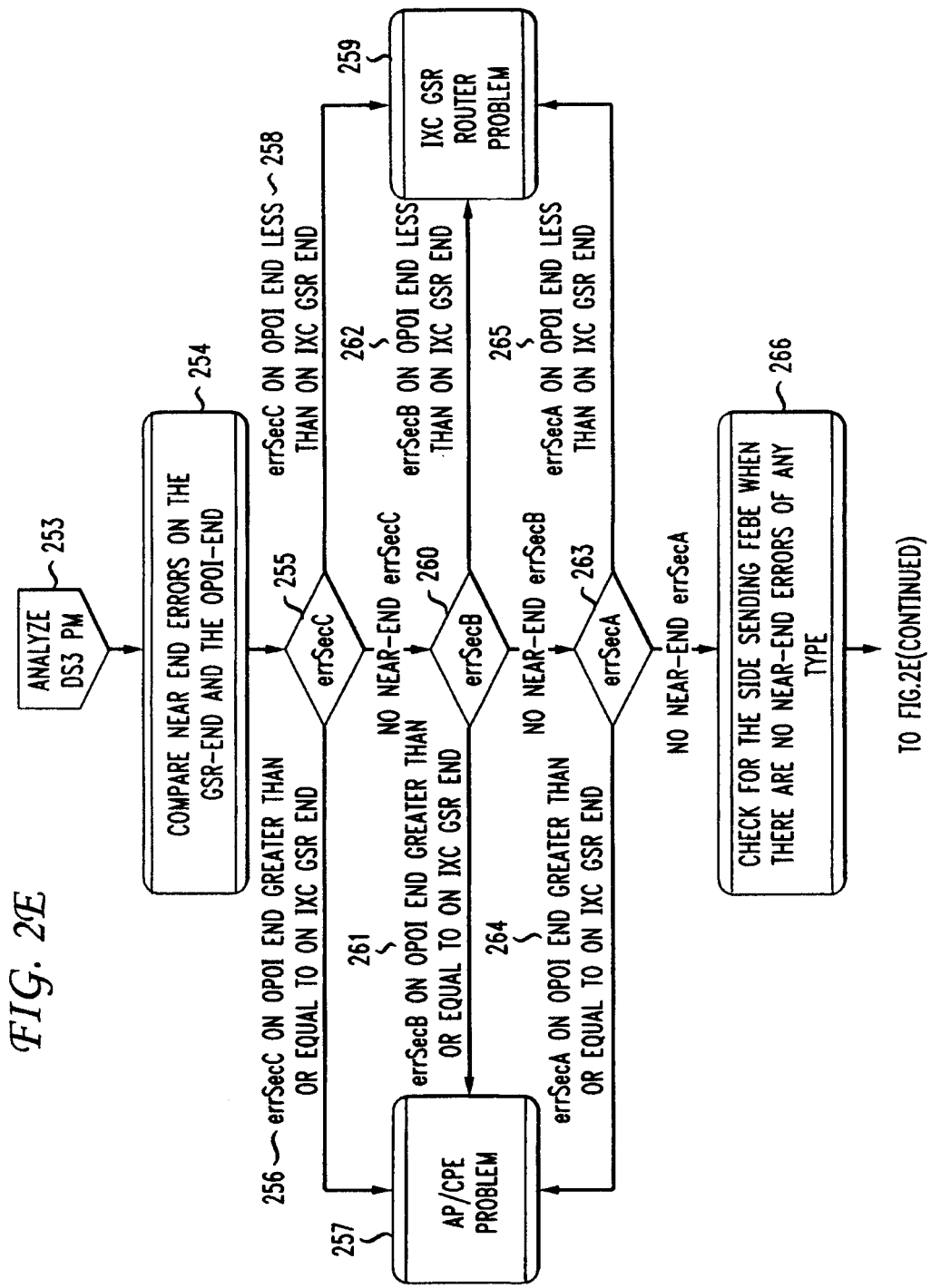
Figure 2E:
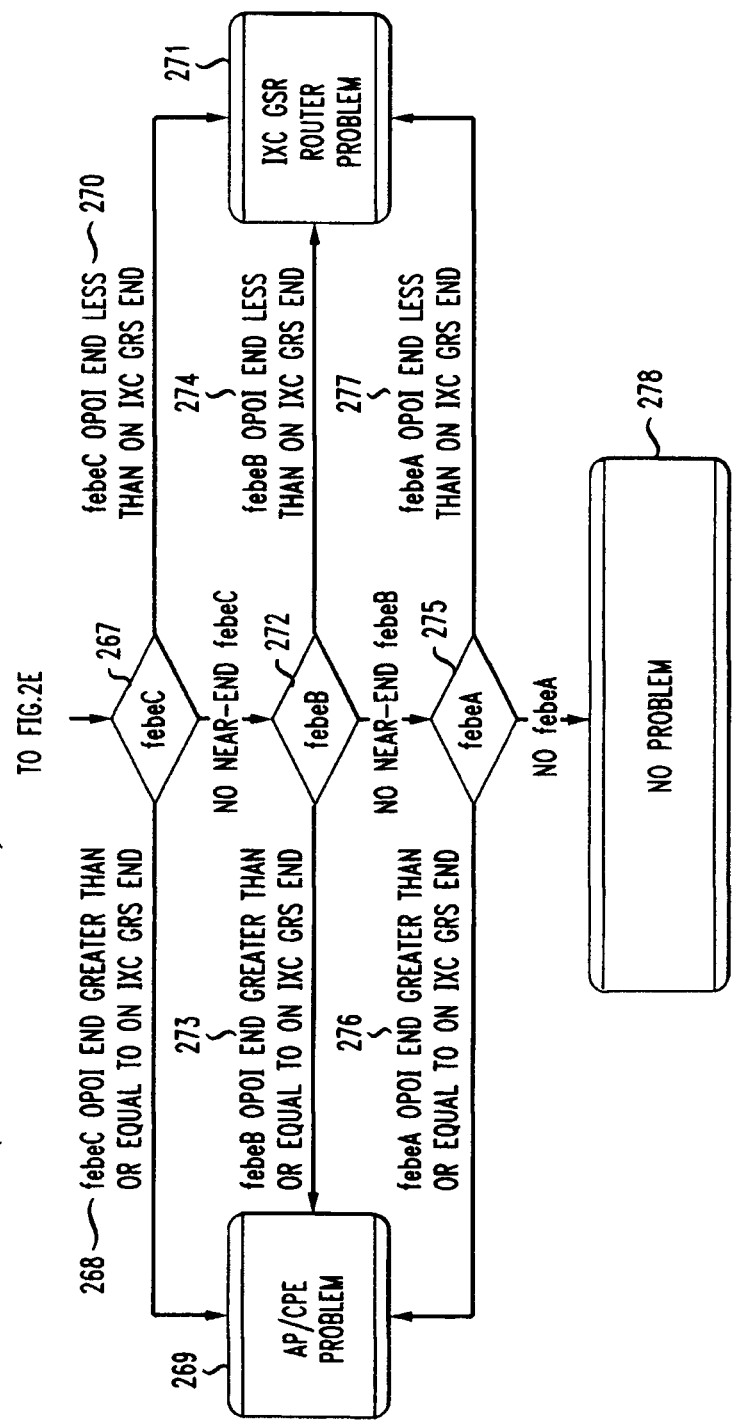

It is certified that error appears in the above-identified patent and that said Letters Patent is hereby corrected as shown below:

Please delete the title page showing an illustrative figure should be deleted and substitute therefor the attached title page Delete drawing sheet 1 thru 7 and insert drawing sheet 1 thru 8 consisting of figures 1–2E as attached Signed and Sealed this
Eleventh Day of October, 2011

David J. Kappos
*Director of the United States Patent and Trademark Office*

(12) United States Patent
Abidi et al.

(10) Patent No.: US 7,933,209 B2
(45) Date of Patent: Apr. 26, 2011

(54) METHOD FOR ISOLATING LAYER 1 PROBLEMS FOR DIGITAL SIGNAL CIRCUITS EMBEDDED IN SONET

(75) Inventors: Mohammad Abidi, Manalapan, NJ (US); Donald R. Bozarth, Sacramento, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 371 days.

(21) Appl. No.: 12/152,563

(22) Filed: May 15, 2008

(65) Prior Publication Data
US 2009/0285575 A1 Nov. 19, 2009

(51) Int. Cl.
*H04L 12/26* (2006.01)
(52) U.S. Cl. ............ 370/241; 370/249; 398/9; 398/17

(58) Field of Classification Search .......... 370/241, 370/249; 398/9, 12, 17
See application file for complete search history.

(56) References Cited

U.S. PATENT DOCUMENTS

| | | | |
|---|---|---|---|
| 2003/0043753 A1* | 3/2003 | Nelson et al. | 370/249 |
| 2005/0220031 A1* | 10/2005 | Barton et al. | 370/242 |
| 2005/0249124 A1* | 11/2005 | Elie-Dit-Cosaque et al. | 370/242 |
| 2006/0216041 A1* | 9/2006 | Hotta et al. | 398/208 |

* cited by examiner

*Primary Examiner* — Pankaj Kumar
*Assistant Examiner* — Gautam Sharma

(57) ABSTRACT

A method is disclosed that integrates performance monitoring data and alarms reported by Layer 3 network elements with alarms and performance monitoring data reported by Layer 1 SONET/SDH network elements to isolate Layer 1 problems on DSX circuits embedded in SONET due to hard failures or errors.

19 Claims, 8 Drawing Sheets